US012809384B2

(12) United States Patent
Morita et al.

(10) Patent No.: US 12,809,384 B2
(45) Date of Patent: Nov. 24, 2026

(54) VEHICLE MANAGEMENT SYSTEM, VEHICLE MANAGEMENT METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Koji Morita, Gotemba (JP); Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 19/178,948

(22) Filed: Apr. 15, 2025

(65) Prior Publication Data

US 2025/0328137 A1 Oct. 23, 2025

(30) Foreign Application Priority Data

Apr. 19, 2024 (JP) ................................ 2024-068139

(51) Int. Cl.
*G05D 1/227* (2024.01)
*B60W 30/06* (2006.01)
(Continued)

(52) U.S. Cl.
CPC ............ *G05D 1/227* (2024.01); *B60W 30/06* (2013.01); *B60W 50/14* (2013.01); *G05D 1/225* (2024.01);
(Continued)

(58) Field of Classification Search
CPC .... G05D 1/227; G05D 1/225; G05D 2101/22; B60W 30/06; B60W 50/14; B60W 2420/403; B60W 2556/45; H04W 4/021; H04W 4/40; H04W 4/80; G06Q 10/02; G08G 1/143; G08G 1/146; G08G 1/20; G08G 1/202; G08G 1/205; G08G 1/141; G08G 1/096725; G08G 1/0968
See application file for complete search history.

(56) References Cited

U.S. PATENT DOCUMENTS

2018/0182200 A1* 6/2018 Gebremeskel .......... H04W 4/24
2018/0345955 A1* 12/2018 Kim ...................... B60W 30/06
(Continued)

FOREIGN PATENT DOCUMENTS

JP 2020-075717 A 5/2020
JP 2021-064117 A 4/2021

*Primary Examiner* — Frederick M Brushaber
(74) *Attorney, Agent, or Firm* — Dinsmore & Shohl LLP

(57) ABSTRACT

A vehicle management system according to the present disclosure manages a vehicle. The vehicle management system includes one or more processors. The one or more processors are configured to: before or after a target vehicle stops at a stop position, start a handover process for establishing a wireless communication with the target vehicle and transferring authority to operate the target vehicle from a user of the target vehicle to the vehicle management system; execute a presence confirmation process for confirming that the user who has dropped off the target vehicle stopped at the stop position is present within a designated range adjacent to the stop position until completion of the handover process; and, when confirming that the user is present within the designated range until the completion, notify the user of the completion.

9 Claims, 15 Drawing Sheets

Third Example

(51) Int. Cl.

| | |
|---|---|
| ***B60W 50/14*** | (2020.01) |
| ***G05D 1/225*** | (2024.01) |
| ***H04W 4/40*** | (2018.01) |
| *G05D 101/00* | (2024.01) |
| *H04W 4/021* | (2018.01) |
| *H04W 4/80* | (2018.01) |

(52) U.S. Cl.

CPC ........ *H04W 4/40* (2018.02); *B60W 2420/403* (2013.01); *B60W 2556/45* (2020.02); *G05D 2101/22* (2024.01); *H04W 4/021* (2013.01); *H04W 4/80* (2018.02)

(56) References Cited

U.S. PATENT DOCUMENTS

| | | | | |
|---|---|---|---|---|
| 2020/0159236 | A1 | 5/2020 | Yoon | |
| 2020/0198620 | A1* | 6/2020 | Nakata .................. | B60W 30/06 |
| 2021/0110714 | A1 | 4/2021 | Maruiwa | |
| 2021/0349457 | A1* | 11/2021 | Ichikawa ........ | B60W 60/00253 |
| 2024/0051519 | A1* | 2/2024 | Hedges ................. | B60W 30/06 |
| 2024/0338028 | A1* | 10/2024 | Jecker ................ | B62D 15/0285 |
| 2025/0128698 | A1* | 4/2025 | Sharma Banjade .. | B60W 30/06 |

* cited by examiner

Second Example

Third Example

Fourth Example

First Combination Example

Second Combination Example

VEHICLE MANAGEMENT SYSTEM, VEHICLE MANAGEMENT METHOD, AND NON-TRANSITORY COMPUTER-READABLE RECORDING MEDIUM

CROSS-REFERENCES TO RELATED APPLICATION

The present disclosure claims priority under 35 U.S.C. § 119 to Japanese Patent Application No. 2024-068139, filed on Apr. 19, 2024, which is incorporated herein by reference in its entirety.

BACKGROUND

Technical Field

The present disclosure relates to a technique for managing a vehicle.

Background Art

JP 2021-064117 A discloses an automated parking system including a server. The server receives a reservation for entry of an automated driving vehicle from a reservation user, and then transmits an authentication code to the reservation user. Thereafter, when the entry (check-in) using the authentication code is performed in a parking lot, the server starts instructions of automated valet parking to the automated driving vehicle of the reservation user in the parking lot.

Moreover, J P 2020-075717 A discloses a method of performing automated valet parking. The method includes a step of starting the automated valet parking. Also, this step includes a step of an infrastructure recognizing a driver of a vehicle for the automated valet parking and the vehicle.

SUMMARY

A "handover process" in which authority to operate a target vehicle is transferred from a user of the target vehicle to a vehicle management system will be considered. Basically, when the handover process is completed, the vehicle management system is allowed to operate the target vehicle. However, there may also be a situation where it is not appropriate for the vehicle management system to operate the target vehicle as it is. In this kind of situation, it is necessary to cause the user to take additional measures for bringing the target vehicle into an appropriate state. However, if the user has already left the place, the vehicle management system cannot cause the user to immediately take the additional measures and cannot also operate the target vehicle. If the target vehicle gets stuck in place while the vehicle management system cannot move the target vehicle without permission, the service by the vehicle management system is stopped.

A vehicle management system according to the present disclosure manages a vehicle. The vehicle management system includes one or more processors. The one or more processors are configured to: before or after a target vehicle stops at a stop position, start a handover process for establishing a wireless communication with the target vehicle and transferring authority to operate the target vehicle from a user of the target vehicle to the vehicle management system; execute a presence confirmation process for confirming that the user who has dropped off the target vehicle stopped at the stop position is present within a designated range adjacent to the stop position until completion of the handover process; and, when confirming that the user is present within the designated range until the completion, notify the user of the completion.

A vehicle management method according to the present disclosure manages a vehicle. The vehicle management method, which is executed by a computer, includes: before or after a target vehicle stops at a stop position, starting a handover process for establishing a wireless communication with the target vehicle and transferring authority to operate the target vehicle from a user of the target vehicle to a vehicle management system; confirming that the user who has dropped off the target vehicle stopped at the stop position is present within a designated range adjacent to the stop position until completion of the handover process; and, when confirming that the user is present within the designated range until the completion, notifying the user of the completion.

A non-transitory computer-readable recording medium according to the present disclosure stores a vehicle management program executed by a computer for managing a vehicle. The vehicle management program causes the computer to execute: before or after a target vehicle stops at a stop position, starting a handover process for establishing a wireless communication with the target vehicle and transferring authority to operate the target vehicle from a user of the target vehicle to a vehicle management system; confirming that the user who has dropped off the target vehicle stopped at the stop position is present within a designated range adjacent to the stop position until completion of the handover process; and, when confirming that the user is present within the designated range until the completion, notifying the user of the completion.

According to the present disclosure, even if the target vehicle is not in an appropriate state when the handover process is completed, it is possible to quickly request the user who has already been confirmed to be present within the designated range (that is, near the target vehicle) to take additional measures for bringing the target vehicle into an appropriate state. This leads to reduction of occurrence of a situation in which the target vehicle gets stuck in place while the target vehicle cannot be operated. This is desirable from the viewpoint of quality and continuity of the service by the vehicle management system.

DETAILED DESCRIPTION

Embodiments of the present disclosure will be described with reference to the accompanying drawings.

1. Overview of Vehicle Management System

Figure 1:
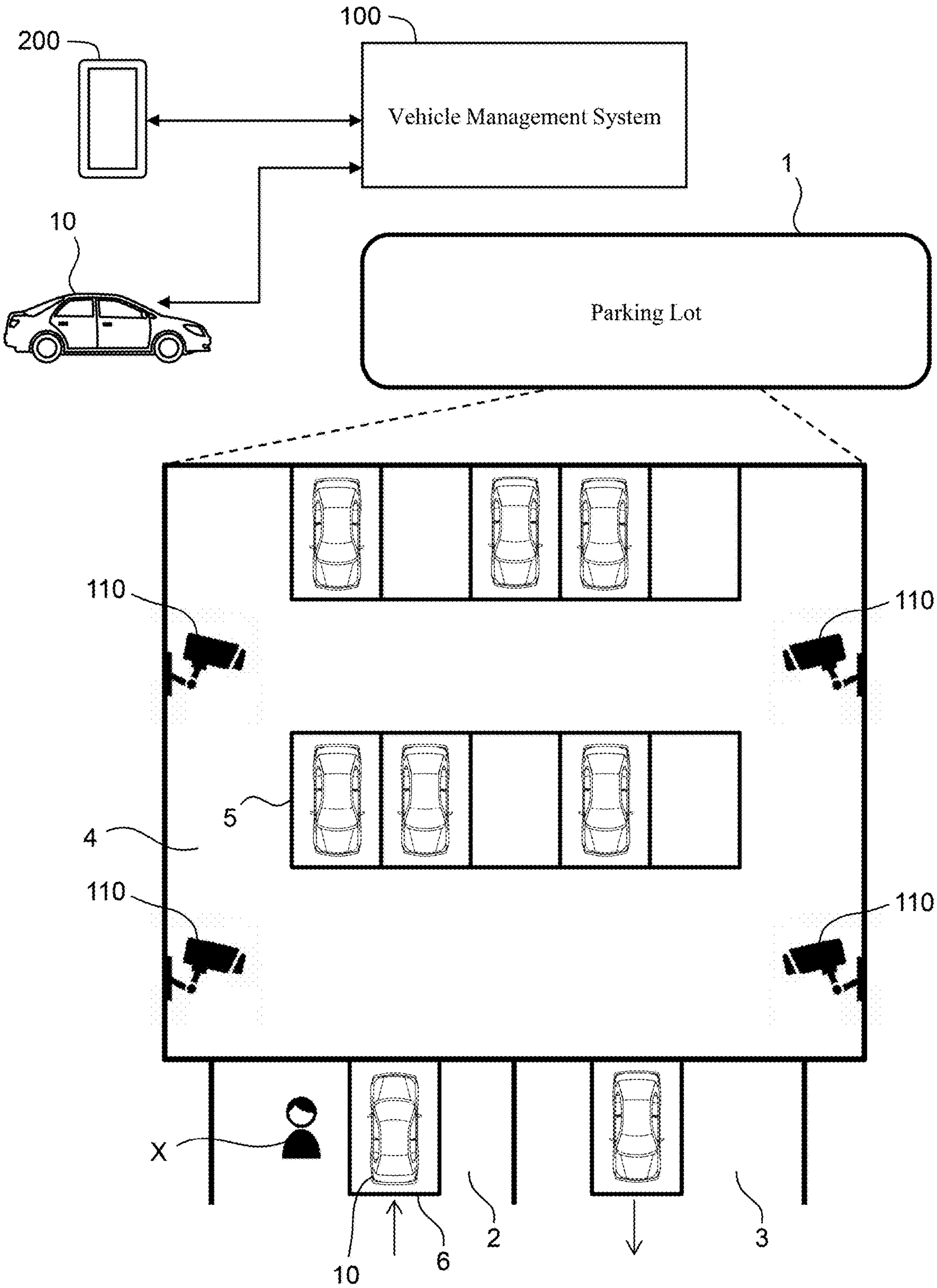
FIG. 1 is a conceptual diagram used to describe an overview of a vehicle management system according to an embodiment.

FIG. 1 is a conceptual diagram used to describe an overview of a vehicle management system 100 according to the present embodiment. The vehicle management system 100 manages a vehicle 10. The vehicle 10 is a "target vehicle" managed by the vehicle management system 100. More specifically, the vehicle management system 100 manages automatic traveling (i.e., unmanned traveling) of the vehicle 10 in a "designated area". In an example shown in FIG. 1, the designated area is a parking lot 1. In this example, the vehicle management system 100 corresponds to an automated valet parking management system that manages automated valet parking (AVP) of the vehicle 10 in the parking lot 1. It should be noted that the designated area is not limited to the parking lot 1, and may be, for example, an area in a factory. The following description will be made by taking the parking lot 1 as an example of the designated area.

The vehicle 10 is configured to execute the AVP in the parking lot 1. The vehicle 10 can automatically travel at least in the parking lot 1 without a driving operation by a driver. More specifically, the automatic traveling of the vehicle 10 in the parking lot 1 is controlled by, for example, the vehicle management system 100 using one or more infrastructure cameras 110. Alternatively, the automatic traveling may be controlled by, for example, cooperation between the vehicle management system 100 and a control system of the vehicle 10. In addition, the vehicle 10 may be an automated driving vehicle that can automatically travel even outside the parking lot 1.

The parking lot 1 includes a drop-off place 2, a pick-up place 3, a passage 4, and a plurality of parking spaces 5. The vehicle 10 that enters the parking lot 1 stops at a stop position 6 of the drop-off place 2, and a user drops off the vehicle 10 at the stop position 6. The stop position 6 provided in the drop-off place 2 corresponds to an example of the "stop position" according to the present disclosure. On the other hand, the vehicle 10 that exits the parking lot 1 stops at the pick-up place 3, and the user gets on the vehicle 10 there. The drop-off place 2 may also be referred to as an entry place, and the pick-up place 3 may also be referred to as an exit place. The passage 4 is an area in which the vehicle 10 travels. The parking spaces 5 is a space in which the vehicle 10 is parked.

The vehicle management system 100 is capable of communicating with the vehicle 10 and manages the vehicle 10. For example, the vehicle management system 100 grasps the position and the state of each vehicle 10 in the parking lot 1 using the one or more infrastructure cameras 110. The vehicle management system 100 allocates a parking space 5 to the vehicle 10. The vehicle management system 100 sends a movement instruction (for example, an entry instruction or an exit instruction) to the vehicle 10 in the parking lot 1. The vehicle management system 100 may provide the vehicle 10 with map information of the parking lot 1. For example, the vehicle management system 100 generates a target route of the vehicle 10 in the parking lot 1 and remotely operates the vehicle 10 in the parking lot 1. In addition, the vehicle management system 100 may provide the vehicle 10 with information on the generated target route.

Moreover, the vehicle management system 100 manages information on a user of an automated valet parking service (AVP service). The vehicle management system 100 is capable of communicating with a user device (i.e., user terminal) 200 operated by the user.

An example of a flow when a user X uses the AVP service will be described below. The member information of the user X is registered in advance in the vehicle management system 100.

First, the user X makes a reservation of the AVP. For example, the user X operates the user device 200 to input information, such as identification (ID) information of the user X, a desired parking lot 1, a desired date of use, and a desired time of use. The user device 200 transmits reservation information including the input information to the vehicle management system 100. The vehicle management system 100 executes a reservation process based on the reservation information and transmits a reservation completion notification to the user device 200. Also, the vehicle management system 100 generates authentication information associated with the reservation information. The authentication information is, for example, a reservation code, such as a quick response (QR) code (registered trademark). More specifically, the vehicle management system 100 transmits the generated authentication information to the user device 200. The user device 200 receives the authentication information and holds the received authentication information.

The vehicle 10 enters (checks in) the parking lot 1 as follows. The vehicle 10 with the user X arrives at the drop-off place 2 of the parking lot 1 and stops at the stop position 6. At the drop-off place 2, the user X (and other occupants if any) gets off the vehicle 10.

When the vehicle 10 enters the parking lot 1, the vehicle management system 100 executes a "handover process" of transferring authority to operate the vehicle 10 (target vehicle) from the user X of the vehicle 10 to the vehicle management system 100. The handover process will be described below in detail. When the handover process is completed, the operation authority of the vehicle 10 is transferred from the user X to the vehicle management system 100. The vehicle management system 100 executes an entry process with regard to the vehicle 10. The entry process includes a process for the automatic traveling of the vehicle 10 toward the parking space 5 allocated to the vehicle 10.

2. Configuration Example of Vehicle Management System

Figure 2:
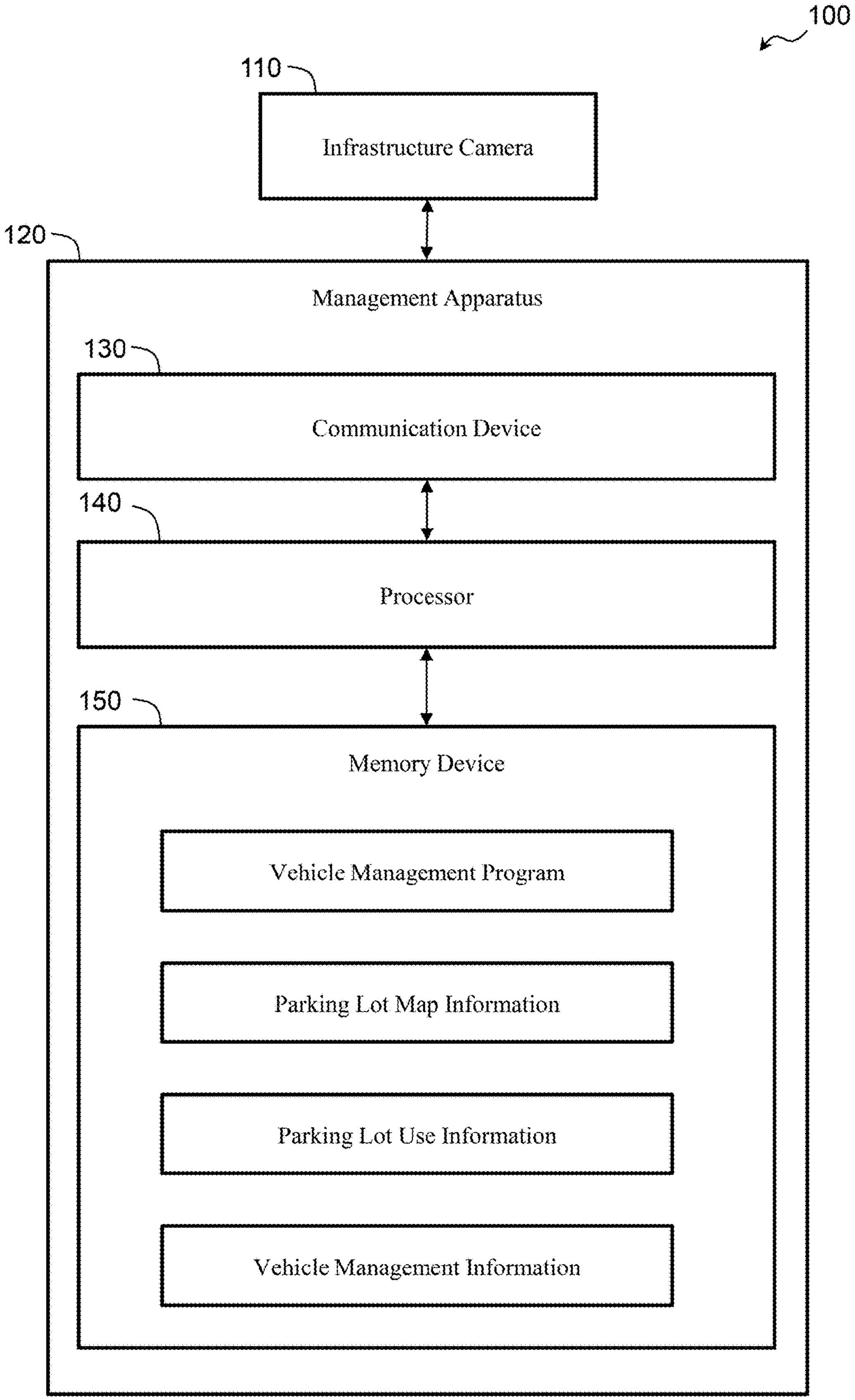
FIG. 2 is a block diagram showing a configuration example of the vehicle management system according to an embodiment.

FIG. 2 is a block diagram showing a configuration example of the vehicle management system 100 according to the present embodiment. The vehicle management system 100 includes one or more infrastructure cameras 110 (hereinafter, simply referred to as an "infrastructure camera 110") and a management apparatus 120.

For example, the infrastructure cameras 110 are installed at various places in the parking lot 1, and each recognize the situation of the parking lot 1 including the drop-off place 2 and the pick-up place 3. Information acquired by the infrastructure camera 110 is transmitted to the management apparatus 120.

The management apparatus 120 manages the vehicle 10 (target vehicle). The management apparatus 120 is installed in, for example, the parking lot 1. Alternatively, the management apparatus 120 may be, for example, a management server (cloud) that manages a plurality of parking lot 1. Alternatively, the management apparatus 120 may be a combination of a local management apparatus installed in the parking lot 1 and a management server.

The management apparatus 120 includes a communication device 130, one or more processors 140 (hereinafter, simply referred to as a "processor 140"), and one or more memory devices 150 (hereinafter, simply referred to as a "memory device 150"). The communication device 130 communicates with each of the vehicle 10, the infrastructure camera 110, and the user device 200 via a communication network.

The processor 140 executes various kinds of processing related to the management of the vehicle 10. Examples of the processor 140 include a central processing unit (CPU), a graphics processing unit (GPU), an application specific integrated circuit (ASIC), and a field-programmable gate array (FPGA). The processor 140 may also be referred to as "circuitry" or "processing circuitry". The "circuitry" is hardware that is programmed to execute the recited functions or that execute the functions. The memory device 150 stores various kinds of information. Examples of the memory device 150 include a volatile memory, a nonvolatile memory, a hard disk drive (HDD), and a solid state drive (SSD). The processor 140 reads out the various kinds of information from the memory device 150 and stores the various kinds of information in the memory device 150.

Moreover, the memory device 150 stores information, such as parking lot map information, parking lot use information, and vehicle management information. The parking lot map information is map information of the parking lot 1. The parking lot use information indicates a usage status (i.e., availability) of the drop-off place 2, the pick-up place 3, and the parking spaces 5 in the parking lot 1. The vehicle management information is information for managing the vehicle 10 that is the target of the AVP. For example, the vehicle management information includes a vehicle ID, user information, entry/exit time information, and position information. The vehicle ID, the user information, the entry/exit time information, and the position information are associated with each vehicle 10. The vehicle ID is identification information of the vehicle 10. The user information is information on the user who uses the vehicle 10. The entry/exit time information is information on the entry and exit times of the vehicle 10. The position information indicates the position of the vehicle 10 in the parking lot 1.

The functions of the management apparatus 120 may be realized by cooperation between the processor 140 that executes a vehicle management program and the memory device 150. The vehicle management program is a computer program for managing the AVP. The vehicle management program is stored in the memory device 150. Alternatively, the vehicle management program may be recorded in a non-transitory computer-readable recording medium. The vehicle management program may be provided via a network.

3. Transfer of Operation Authority

In order to start the automatic traveling of the vehicle 10 (target vehicle) by the vehicle management system 100, it is necessary to transfer the authority to operate the vehicle 10 (operation authority) from the user to the vehicle management system 100. The processing executed by the vehicle management system 100 (processor 140) for the transfer of the operation authority includes the handover process (i.e., authority transfer process) described above.

3-1. Handover Process

The handover process includes a process for establishing a wireless communication with the vehicle 10 and a process for identifying the vehicle 10 as a target vehicle (i.e., vehicle identification process). The identification (authentication) of the target vehicle is necessary to confirm that the vehicle 10 for which a service of the automatic traveling is to be provided is the vehicle 10 (target vehicle) of an authorized user.

For example, the vehicle management system 100 starts the handover process after the vehicle 10 stops at the stop position 6 (see FIG. 1) in the drop-off place 2. More specifically, the vehicle management system 100 starts the handover process after recognizing that, for example, the user has dropped off the vehicle 10 using the infrastructure camera 110. It should be noted that the handover process may be started before the vehicle 10 (target vehicle) stops at the stop position 6, instead of after the vehicle 10 stops at the stop position 6. More specifically, the vehicle management system 100 may start the handover process when the vehicle 10 is traveling in a designated zone located before the stop position 6.

The vehicle identification process is started, for example, in response to transmitting a handover request from the vehicle management system 100 to the vehicle 10. The method of the vehicle identification process is not particularly limited. For example, the vehicle identification process may be executed using the following action of the vehicle 10. That is, in an example of the vehicle identification process using the action, the vehicle management system 100 instructs the vehicle 10 to perform a designated action after establishing a wireless communication with the vehicle 10. If the vehicle 10 is a legitimate target vehicle, the vehicle 10 is expected to perform the designated action in accordance with the instruction. After the instruction is given, the vehicle management system 100 recognizes an action performed by the vehicle 10 using a sensor, such as the infrastructure camera 110. When the recognized action matches the expected action, the vehicle management system 100 identifies, as the target vehicle, the vehicle 10 that has performed the recognized action. The designated action may be a visible action that can be visually detected or may be an audible action that can be audibly detected. Examples of the visible action include lighting or blinking of a headlight or a brake light, blinking of a blinker, operation of a wiper, or opening or closing of a door or a window. Examples of the audible action include sounding of a horn or starting of an internal combustion engine (i.e., increasing the engine speed). The visible or audible action is performed in a pattern of operation specified by the vehicle management system 100. Also, the instruction of the vehicle management system 100 may include a request to repeat a specified operation pattern. In an example using the audible action, the vehicle management system 100 may include a microphone for detecting the audible action.

3-2. Issue

Basically, when the handover process is completed, the vehicle management system 100 is allowed to operate the vehicle 10 (target vehicle). However, there may also be a situation in which it is not appropriate for the vehicle management system 100 to operate the vehicle 10 as it is (for example, a window of the vehicle 10 is opened, a state of charge (SOC) remaining in the vehicle 10 is low). In this kind of situation, it is necessary to cause the user X to take additional measures for bringing the vehicle 10 into an appropriate state. However, the handover process will take some time. Therefore, there is a possibility that the user X has already moved to a place far away from the stop position 6 of the vehicle 10 by the time the handover process is complete. Especially, it takes time when the vehicle 10 performs a designated action in the vehicle identification process. If the user X has already moved far away from the stop position 6 of the vehicle 10, the vehicle management system 100 cannot cause the user X to immediately take additional measures to bring the vehicle 10 into an appropriate state and cannot also operate the vehicle 10. If the vehicle 10 gets stuck in place while the vehicle management system 100 cannot move the vehicle 10 without permission, the service by the vehicle management system 100 is stopped.

3-3. Countermeasure

Figure 3:
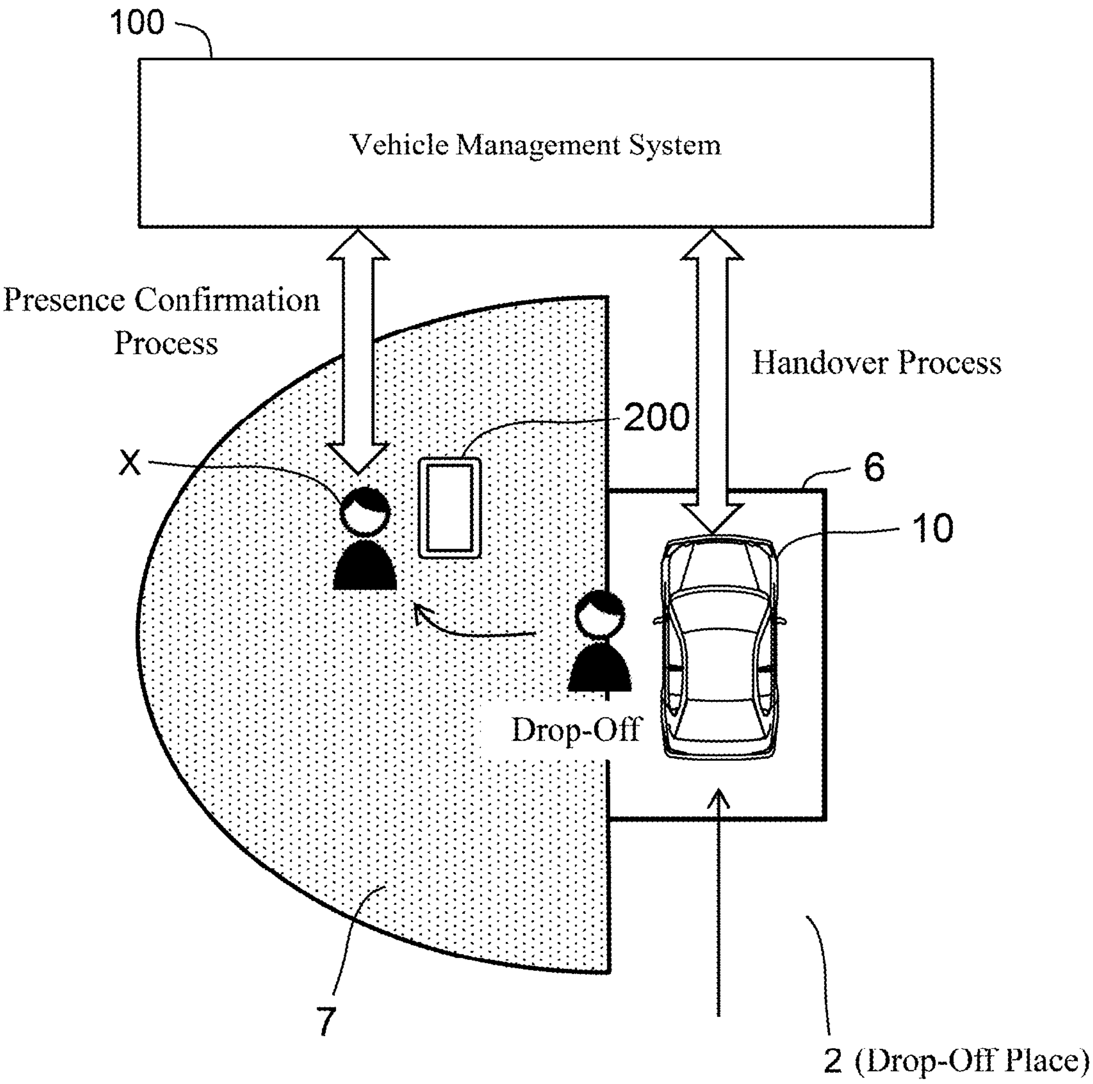
FIG. 3 is a conceptual diagram used to describe a countermeasure against an issue related to a handover process.

FIG. 3 is a conceptual diagram used to describe a countermeasure against an issue related to the handover process. In view of the issue described above, the processor 140 of the vehicle management system 100 according to the present embodiment executes the following "presence confirmation process" together with the handover process. The presence confirmation process is executed to confirm that the user X who has dropped off the vehicle 10 (target vehicle) stopped at the stop position 6 of the drop-off place 2 in the parking lot 1 as illustrated in FIG. 3 is present within a designated range 7 adjacent to the stop position 6 until the handover process is completed. When the processor 140 confirms in the presence confirmation process that the user X is present within the designated range 7 until the completion of the handover process, the processor 140 notifies the user X of the completion of the handover process.

Figure 4:
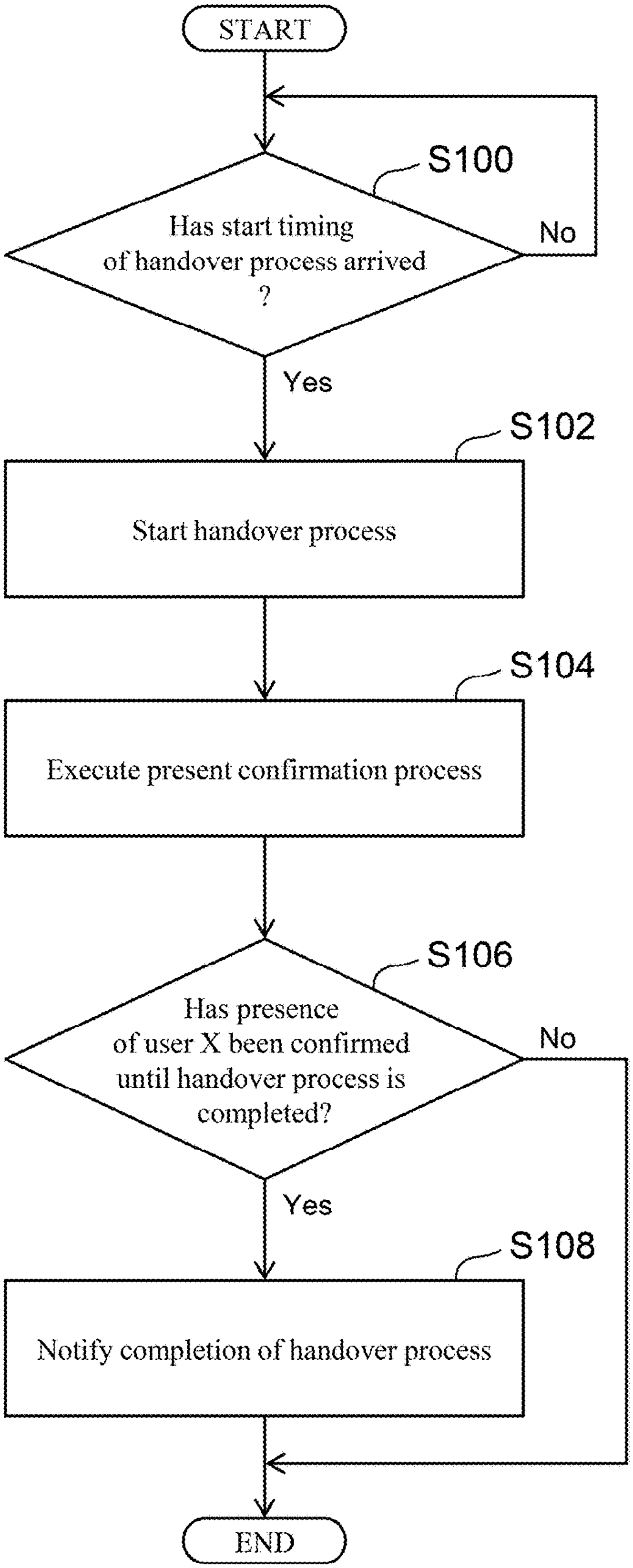
FIG. 4 is a flowchart illustrating an example of processing executed in the vehicle management system according to an embodiment.

FIG. 4 is a flowchart illustrating an example of processing executed in the vehicle management system 100 according to the present embodiment.

In step S100, the processor 140 determines whether or not the start timing of the handover process has arrived. To be specific, in an example in which the handover process is started after the vehicle 10 stops at the stop position 6, the determination in step S100 is made based on, for example, whether or not the infrastructure camera 110 recognizes that the user has dropped off the vehicle 10. On the other hand, in an example in which the handover process is started before the vehicle 10 stops at the stop position 6, the determination in step S100 is made based on, for example, whether or not the vehicle 10 has entered a designated authority transfer zone having a certain range before the stop position 6. When the processor 140 determines that the start timing of the handover process has arrived (step S100; Yes), the processing proceeds to step S102.

In step S102, the processor 140 starts the handover process. The handover process includes the process for establishing a wireless communication with the vehicle 10 and the vehicle identification process.

In step S104 subsequent to step S102, the processor 140 executes (starts) the presence confirmation process. The presence confirmation process will be described below in detail. Thereafter, the processing proceeds to step S106. It should be noted that, in addition to the execution of the presence confirmation process, the processor 140 may notify the user X, via the user device 200, of a request for the user X not to leave the surroundings of the vehicle 10 until the handover process is completed after the user X gets off the vehicle 10.

In step S106, the processor 140 determines whether or not the processor 140 has confirmed that the user X is present within the designated range 7 until the handover process is completed. As a result, when the presence of the user X has been confirmed by the presence confirmation process until the handover process is completed (step S106; Yes), the processor 140 notifies the user X of the completion of the handover process (step S108). Specifically, for the notification, the processor 140 may transmit, for example, information indicating the completion of the handover process to the user device 200. Alternatively, for example, the processor 140 may notify the user X of the completion of the handover process by using a notification device, such as a speaker, installed in the drop-off place 2. In addition, when the presence of the user X is confirmed until the handover process is completed, the processor 140 ends the presence confirmation process. On the other hand, when the presence of the user X cannot be confirmed by the presence confirmation process until the handover process is completed (step S106; No), the processing proceeds to "END".

4. Details of Presence Confirmation Process

First to fourth examples of the presence confirmation process will be described in order.

4-1. First Example (Tracking)

Figure 5:
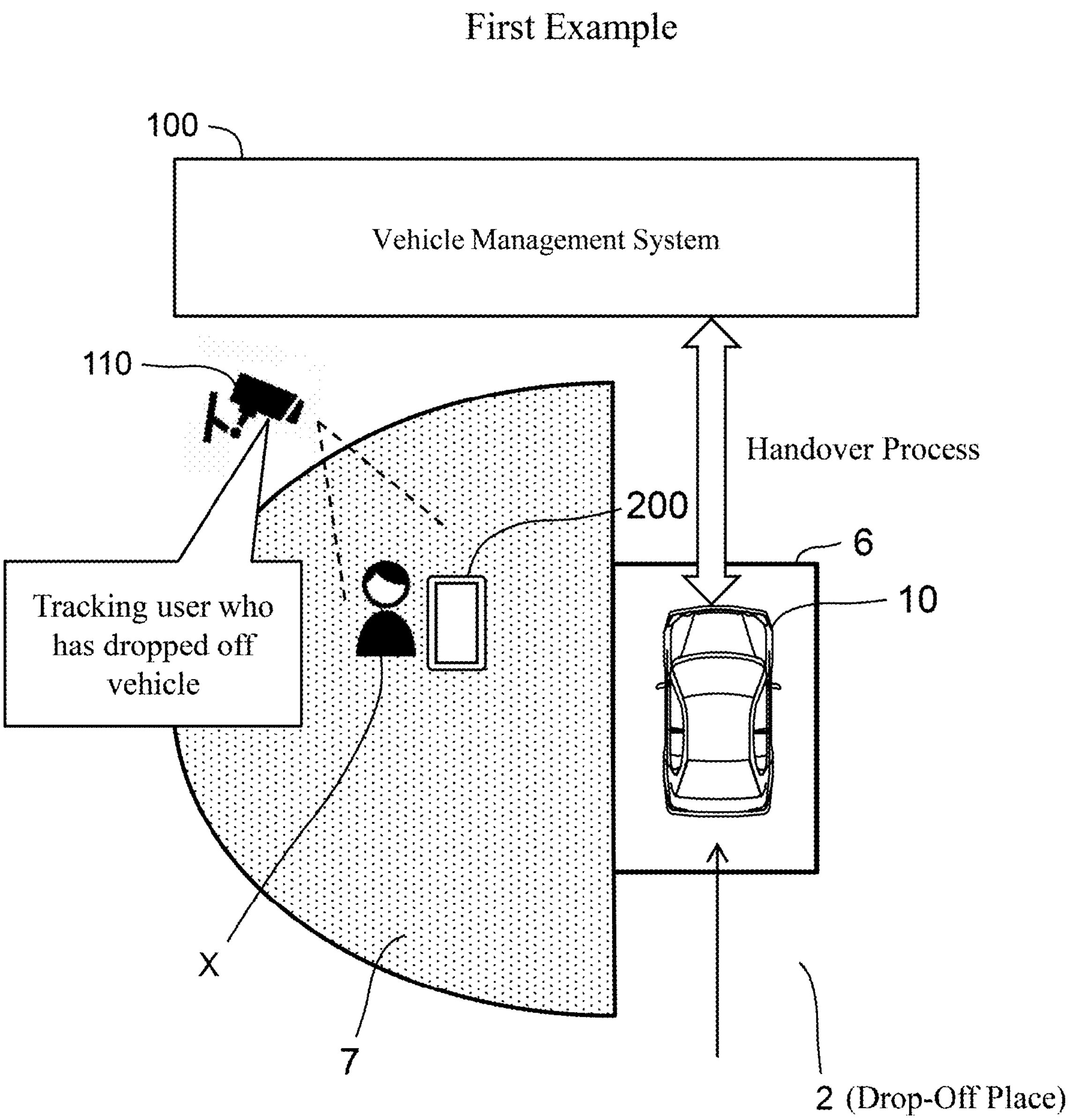
FIG. 5 is a conceptual diagram used to describe a first example of a presence confirmation process.

FIG. 5 is a conceptual diagram used to describe a first example of the presence confirmation process. In the first example, the infrastructure camera 110 illustrated in FIG. 2 includes at least one infrastructure camera 110 having an angle of view including at least a part of the designated range 7 adjacent to the stop position 6. The at least one infrastructure camera 110 is installed in the drop-off place 2, for example.

In the first example, the presence confirmation process includes acquiring an image I1 captured by the at least one infrastructure camera 110. The presence confirmation process also includes confirming that the user X is present within the designated range 7 until the completion of the handover process by tracking the user X after dropping off the vehicle 10 (target vehicle) based on the acquired image I1. To be more specific, based on the image I1, the processor 140 detects the user X who has dropped off the vehicle 10 and performs tracking of the user X. This tracking can be performed by using, for example, a person re-identification (Person Re-ID) technique. In addition, in order to acquire the image I1, a camera (in-vehicle camera) 12 (see FIG. 11)

mounted in the vehicle 10 so as to recognize the situation around the vehicle 10 may be used instead of the infrastructure camera 110.

Figure 6:
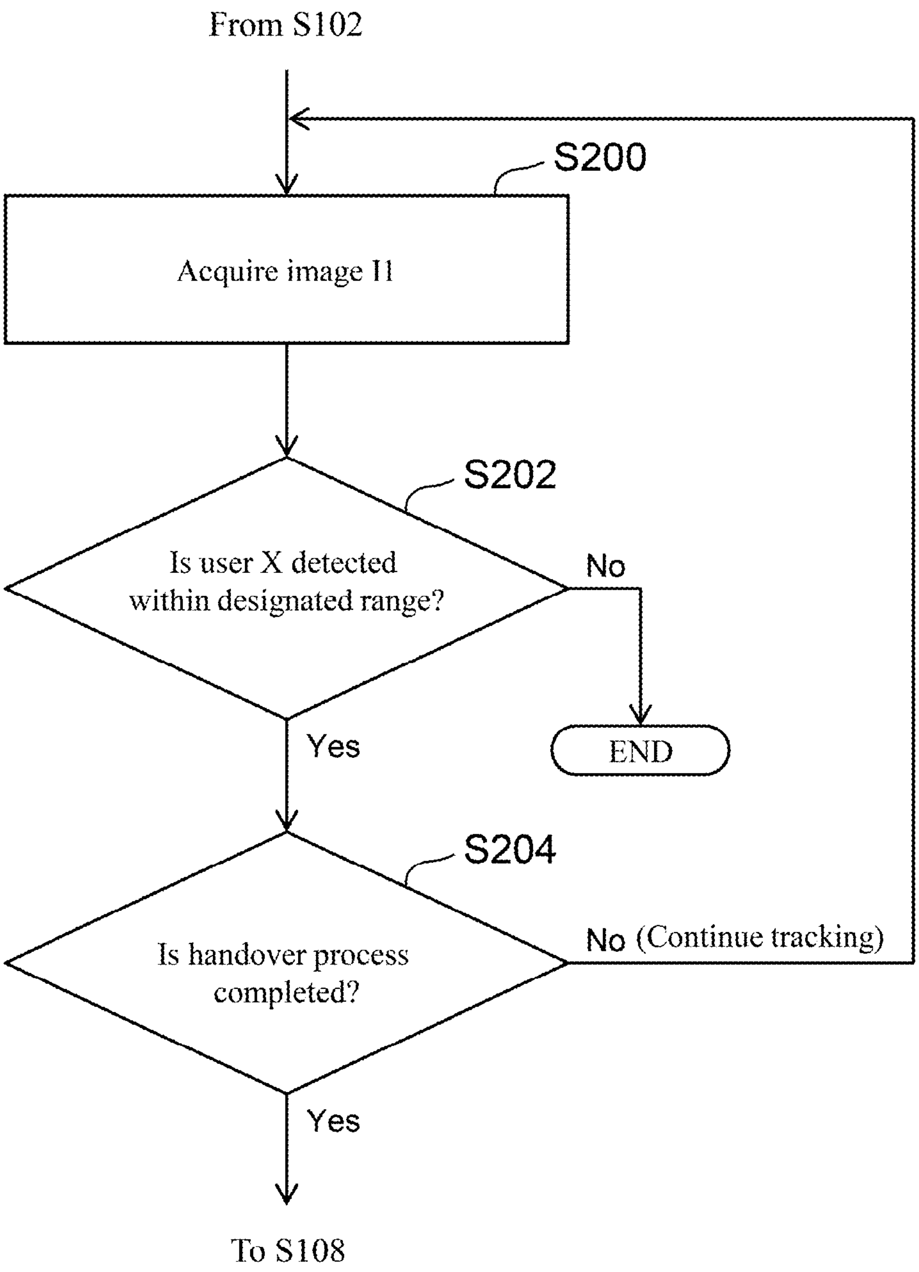
FIG. 6 is a flowchart illustrating an example of the flow of the presence confirmation process according to the first example.

FIG. 6 is a flowchart illustrating an example of the flow of the presence confirmation process according to the first example. The processing of steps S104 and S106 in FIG. 4 is more specifically represented by the processing shown in FIG. 6 while reflecting the characteristics of the first example.

In FIG. 6, in step S200 subsequent to step S102, the processor 140 acquires an image I1 captured by the at least one infrastructure camera 110. The acquired image I1 is stored in the memory device 150. Thereafter, the processing proceeds to step S202.

In step S202, the processor 140 determines whether or not the user X is detected within the designated range 7 included in the image I1 acquired in step S200. As a result, when the user X is detected (step S202; Yes), the processing proceeds to step S204. On the other hand, when the user X is not detected (step S202; No), the processing proceeds to "END". It should be noted that the processing may proceed to "END" when the user X is not detected a plurality of times in a row in the determination in step S202.

In step S204, the processor 140 determines whether or not the handover process is completed. As a result, when the handover process is not yet completed (step S204; No), the processing returns to step S200. That is, the processor 140 acquires a new image I1 and continues the tracking of the user X. On the other hand, when the handover process is completed (step S204; Yes), the processing proceeds to step S108 (see FIG. 4). Also, the processor 140 ends the presence confirmation process.

4-2. Second Example (Near Field Communication)

Figure 7:
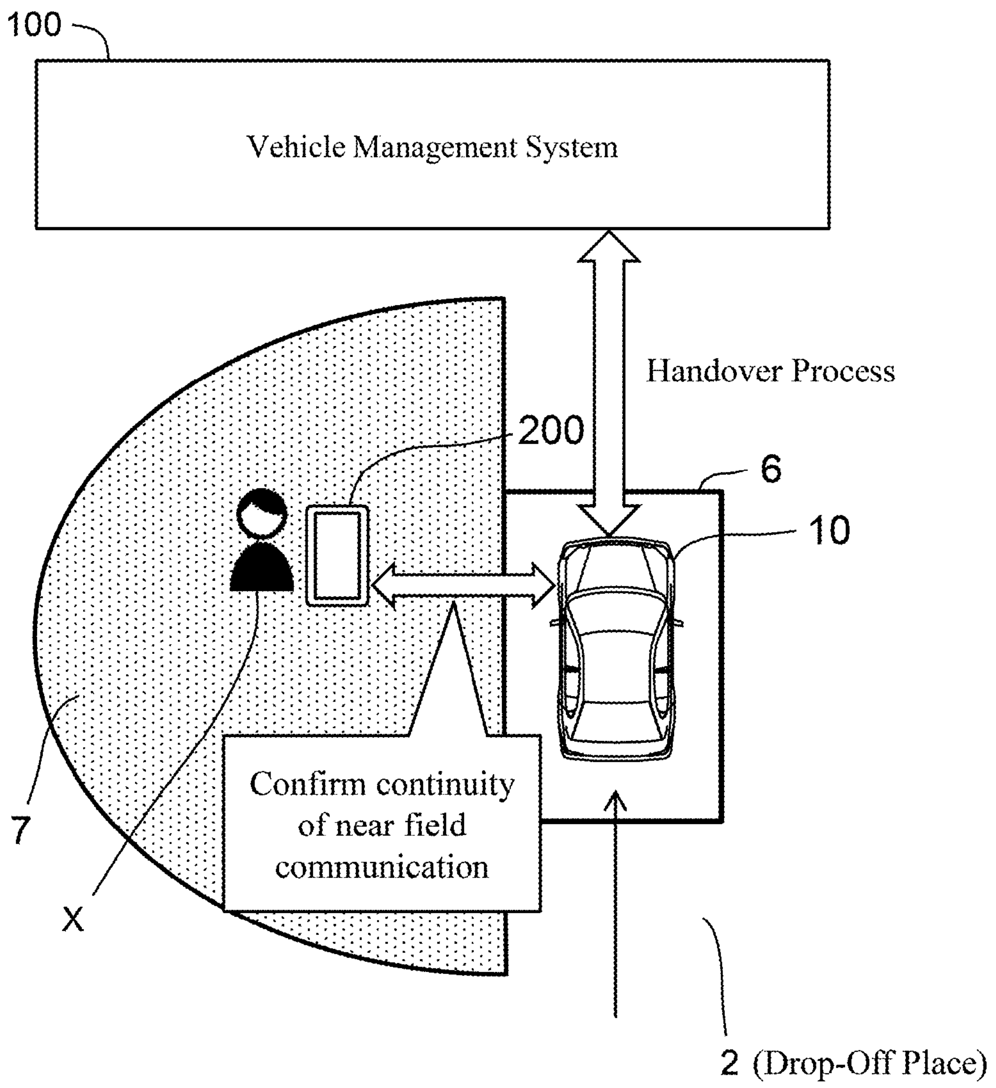
FIG. 7 is a conceptual diagram used to describe a second example of the presence confirmation process.

FIG. 7 is a conceptual diagram used to describe a second example of the presence confirmation process. In the second example, the designated range 7 corresponds to a communicable range of near field communication (for example, Bluetooth (registered trademark)) between the vehicle 10 (target vehicle) and the user device 200 of the user X.

In the second example, the presence confirmation process includes confirming that the user X is present within the designated range 7 until the completion of the handover process by confirming that the near field communication between the vehicle 10 (target vehicle) and the user device 200 is continued.

Figure 8:
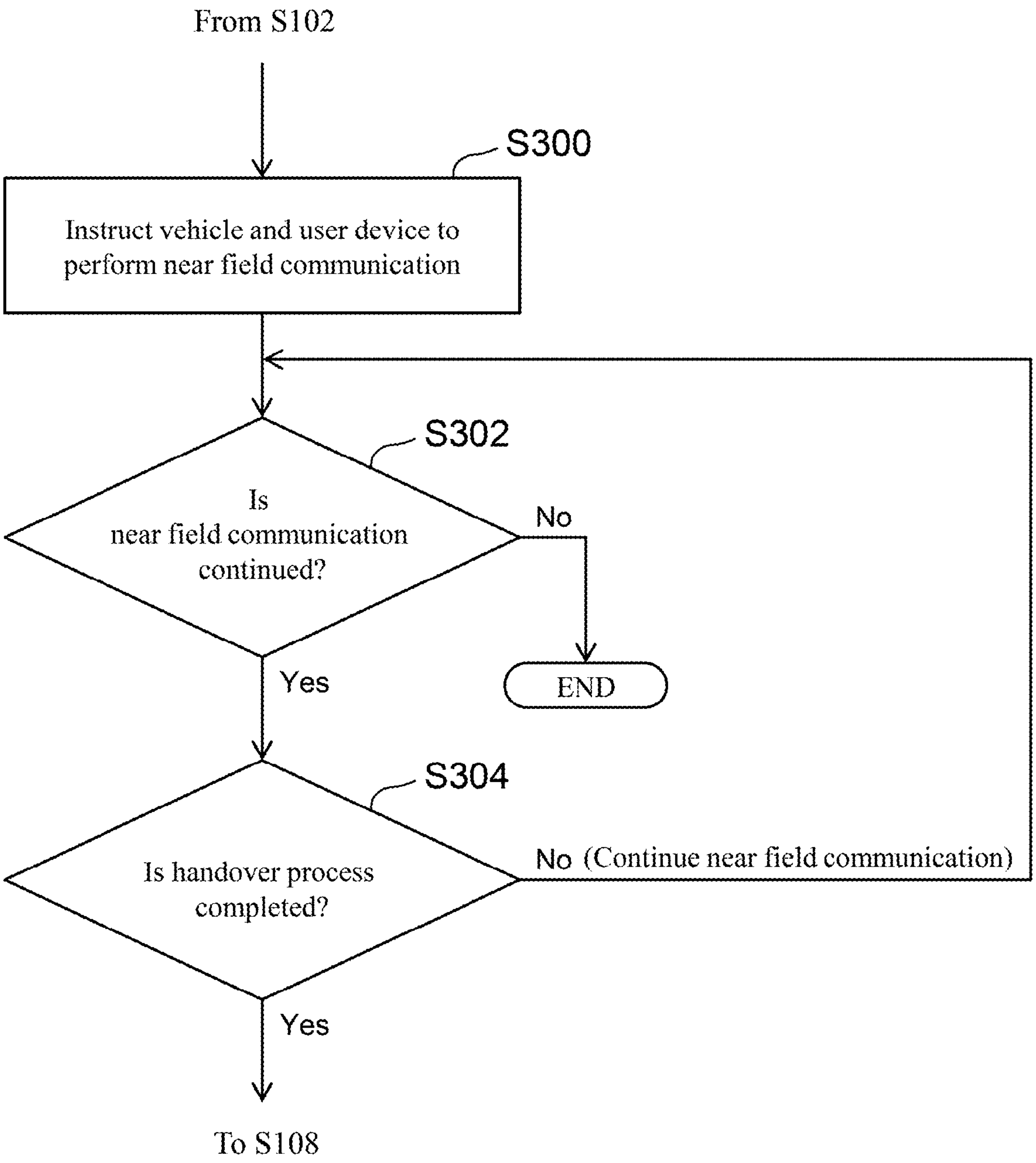
FIG. 8 is a flowchart illustrating an example of the flow of the presence confirmation process according to the second example.

FIG. 8 is a flowchart illustrating an example of the flow of the presence confirmation process according to the second example. The processing of steps S104 and S106 in FIG. 4 is more specifically represented by the processing shown in FIG. 8 while reflecting the characteristics of the second example.

In FIG. 8, in step S300 subsequent to step S102, the processor 140 instructs the vehicle 10 and the user device 200 to perform the near field communication between the vehicle 10 and the user device 200. This instruction is executed when, for example, the user X is recognized to have dropped off the vehicle 10 by the use of the infrastructure camera 110. Alternatively, the instruction may be executed before the drop off.

In step S302 subsequent to step S300, the processor 140 determines whether or not the near field communication between the vehicle 10 and the user device 200 is continued. This determination can be made based on, for example, information indicating whether or not the near field communication is continued, which is acquired from the vehicle 10 or the user device 200.

When the near field communication is continued (step S302; Yes), the processor 140 determines whether or not the handover process is completed (step S304). As a result, when the handover process is not yet completed (step S304; No), the processing returns to step S302. That is, the processor 140 continues to confirm that the near field communication is continued. On the other hand, when the handover process is completed (step S304; Yes), the processing proceeds to step S108 (see FIG. 4). Also, the processor 140 ends the presence confirmation process.

On the other hand, when the near field communication is not continued (step S302; No), the processing proceeds to "END". It should be noted that, when the processor 140 determines in step S302 that the near field communication is not continued, the processor 140 may repeatedly execute the determination in step S302 until the interruption time of the near field communication reaches a designated time. Then, when the interruption time reaches the designated time, the processing may proceed to "END".

4-3. Third Example (Confirming Code with Infrastructure Camera)

Figure 9:
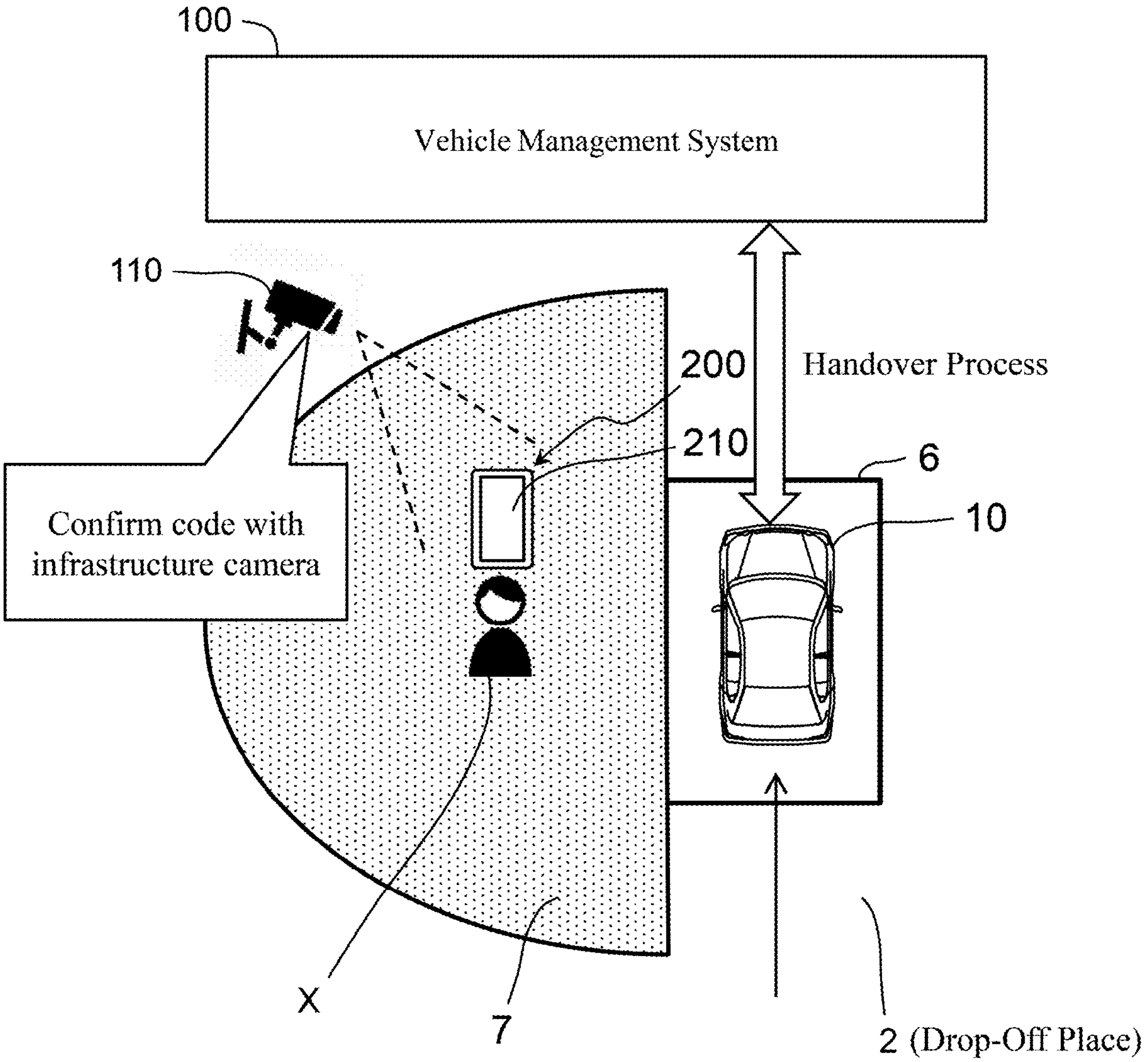
FIG. 9 is a conceptual diagram used to describe a third example of the presence confirmation process.

FIG. 9 is a conceptual diagram used to describe a third example of the presence confirmation process. As in the first example, in the third example, the infrastructure camera 110 illustrated in FIG. 2 includes at least one infrastructure camera 110 having an angle of view including at least a part of the designated range 7 adjacent to the stop position 6. The at least one infrastructure camera 110 is installed in the drop-off place 2. A designated code (e.g., a reservation code such as the QR code) is transmitted from the vehicle management system 100 to the user device 200 when, for example, the user X makes a reservation of the AVP. In addition, the transmission of the designated code from the vehicle management system 100 may be performed, for example, after the vehicle 10 arrives at the parking lot 1.

In the third example, the presence confirmation process includes acquiring an image I1 captured by the at least one infrastructure camera 110. The presence confirmation process also includes requesting the user X to cause the infrastructure camera 110 to read a designated code displayed on the user device 200 of the user X after the handover process is completed. The presence confirmation process further includes confirming, based on the image I1, that the designated code is displayed on the user device 200.

Figure 10:
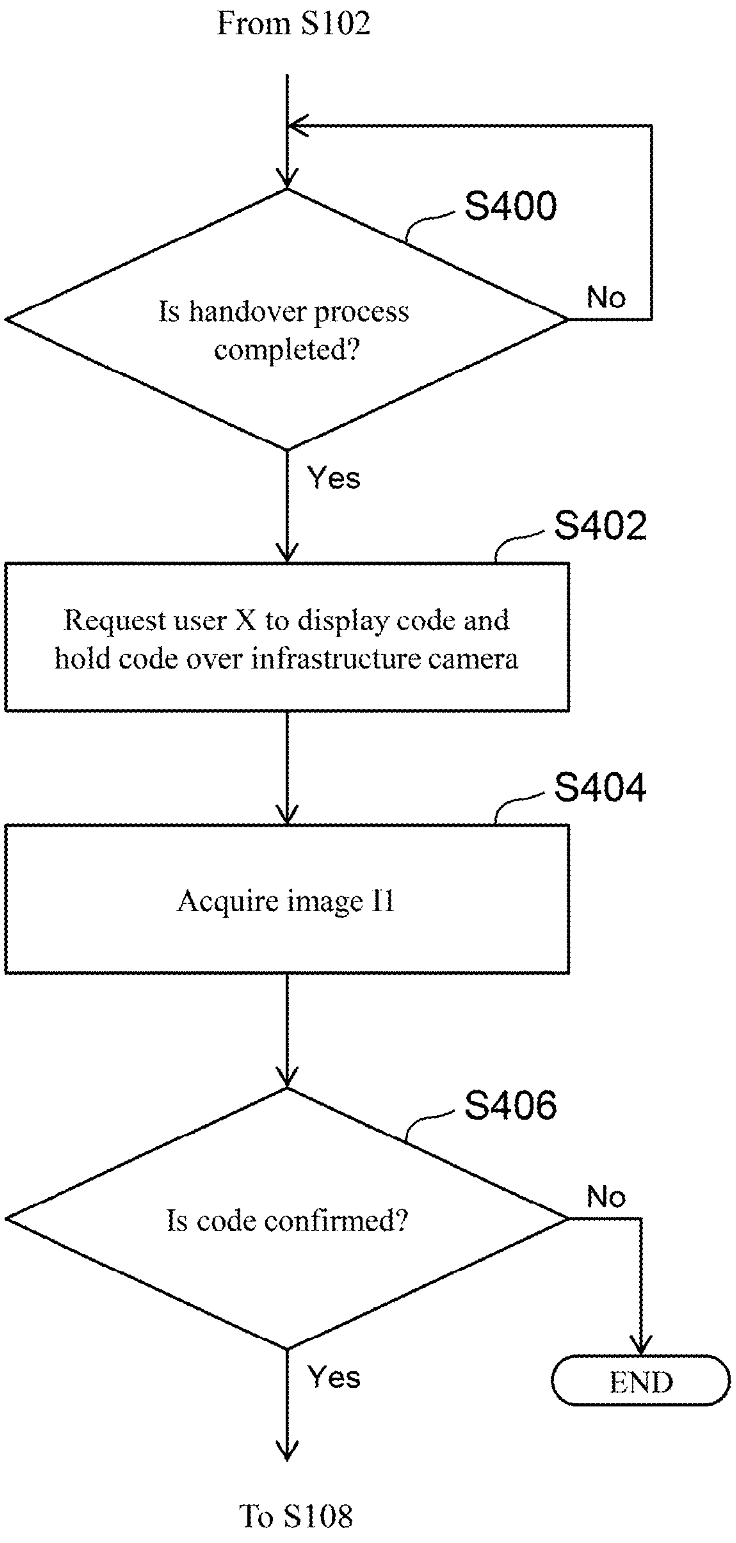
FIG. 10 is a flowchart illustrating an example of the flow of the presence confirmation process according to the third example.

FIG. 10 is a flowchart illustrating an example of the flow of the presence confirmation process according to the third example. The processing of steps S104 and S106 in FIG. 4 is more specifically represented by the processing shown in FIG. 10 while reflecting the characteristics of the third example.

In FIG. 10, after step S102, the processor 140 determines whether or not the handover process is completed (step S400). As a result, when the handover process is completed (step S400; Yes), the processing proceeds to step S402.

In step S402, the processor 140 requests the user X, via the user device 200, to display the designated code on a display 210 (see FIG. 9) of the user device 200 and to hold the designated code over the infrastructure camera 110 in order to cause the infrastructure camera 110 to read the displayed designated code. Thereafter, the processing proceeds to step S404.

In step S404, the processor 140 acquires an image I1 captured by the at least one infrastructure camera 110. The acquired image I1 is stored in the memory device 150. Thereafter, the processing proceeds to step S406.

In step S406, the processor 140 determines whether or not the designated code is displayed on the user device 200, based on the image I1 captured by the infrastructure camera 110. As a result, when the display of the designated code is confirmed (step S406; Yes), the processing proceeds to step S108 (see FIG. 4). That is, when the display of the designated code is confirmed, it is determined that the user X has been present within the designated range 7 until the handover process is completed. Also, the processor 140 ends the presence confirmation process.

On the other hand, when the display of the designated code is not confirmed (step S406; No), the processing proceeds to "END". It should be noted that, when the display of the designated code is not confirmed, the processor 140 may repeatedly execute the processing of steps S402 to S406 a designated number of times or for a designated period of time.

4-4. Fourth Example (Confirming Code with in-Vehicle Camera)

Figure 11:
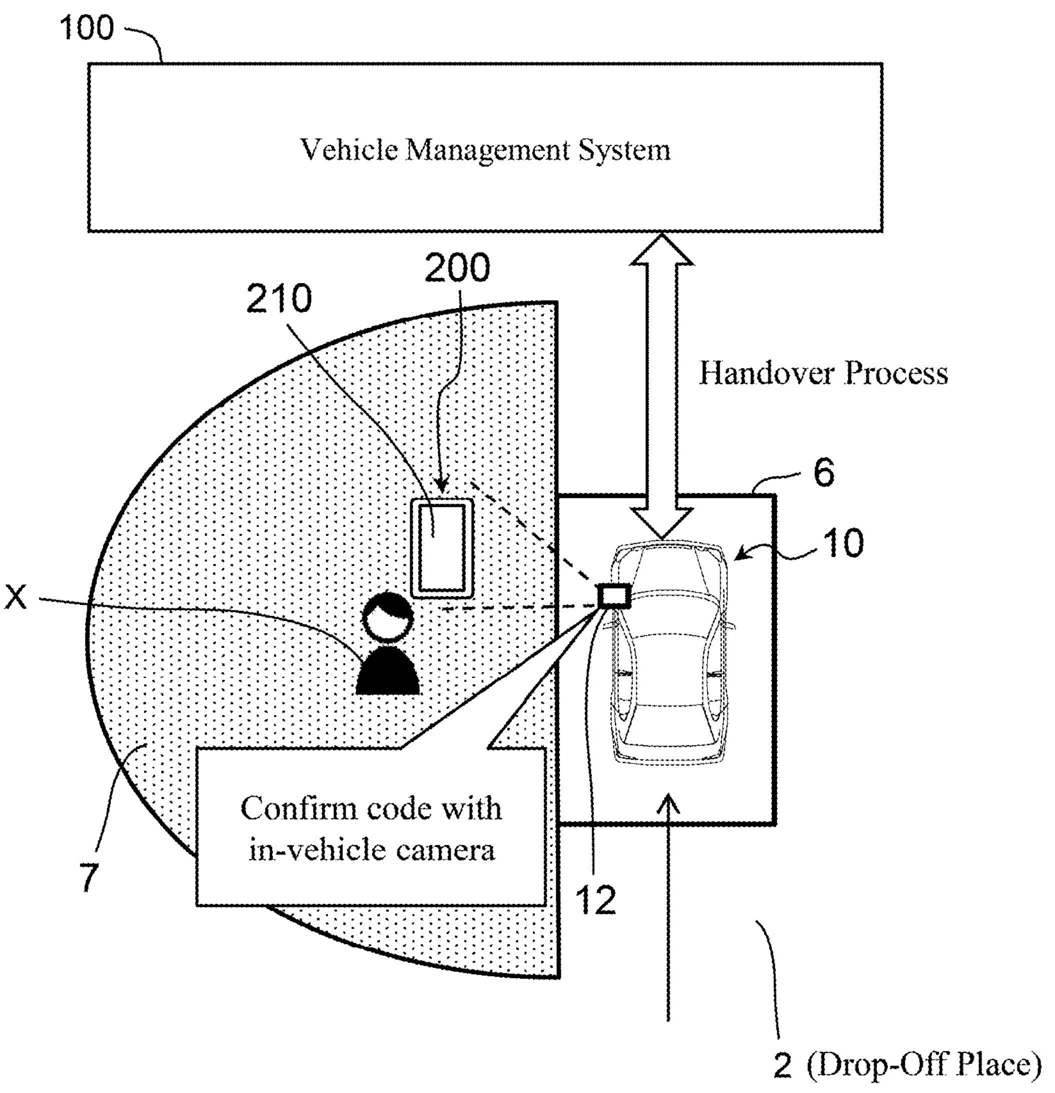
FIG. 11 is a conceptual diagram used to describe a fourth example of the presence confirmation process.

FIG. 11 is a conceptual diagram used to describe a fourth example of the presence confirmation process. The fourth example is different from the third example in that the camera (in-vehicle camera) 12 mounted on the vehicle 10 (target vehicle) is used instead of the infrastructure camera 110 in order to read the designated code displayed on the user device 200.

Figure 12:
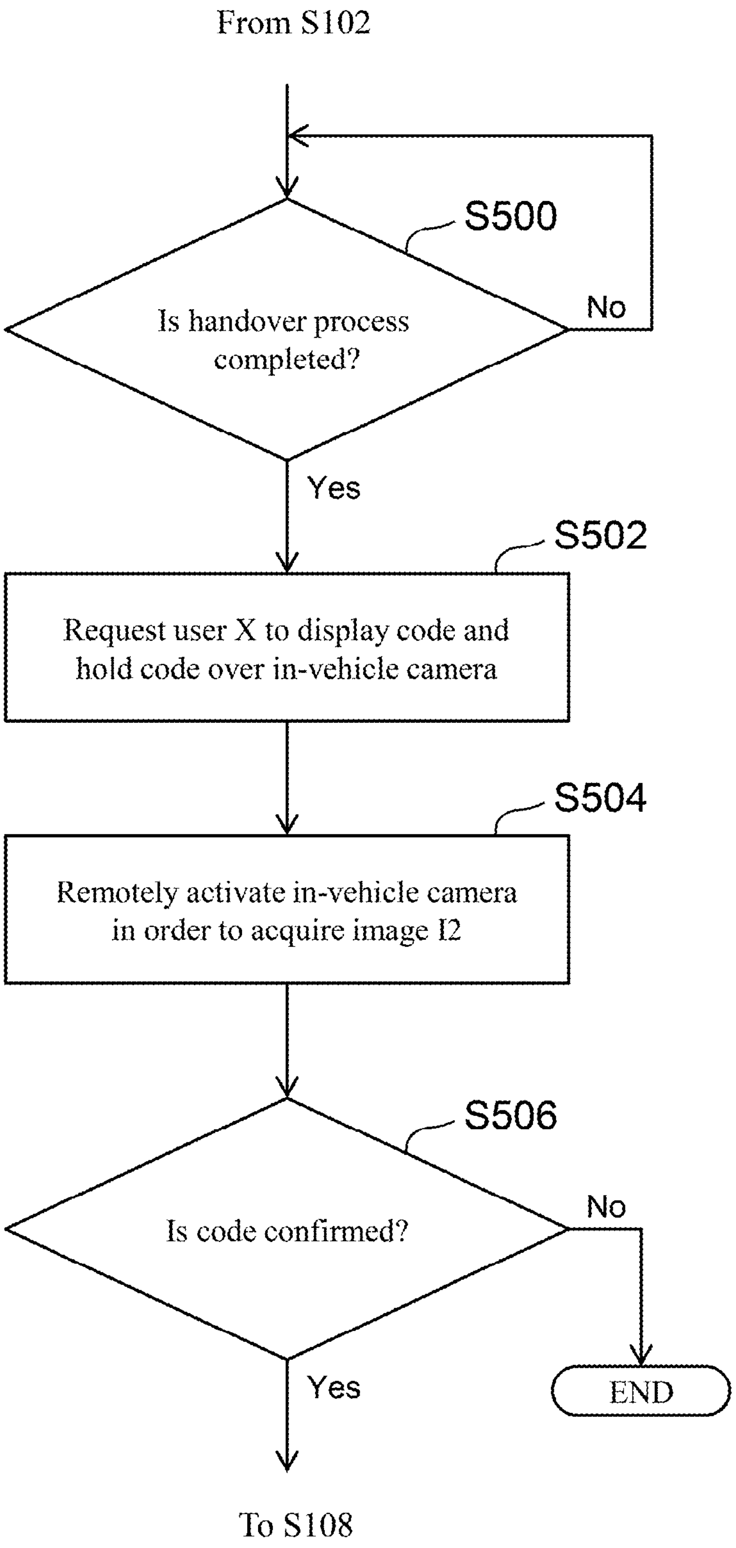
FIG. 12 is a flowchart illustrating an example of the flow of the presence confirmation process according to the fourth example.

FIG. 12 is a flowchart illustrating an example of the flow of the presence confirmation process according to the fourth example. The processing of steps S104 and S106 in FIG. 4 is more specifically represented by the processing shown in FIG. 12 while reflecting the characteristics of the fourth example.

In FIG. 12, after step S102, the processor 140 determines whether or not the handover process is completed (step S500). As a result, when the handover process is completed (step S500; Yes), the processing proceeds to step S502.

In step S502, the processor 140 requests the user X, via the user device 200, to display the designated code on the display 210 of the user device 200 and to hold the designated code over the in-vehicle camera 12 to cause the in-vehicle camera 12 to read the displayed designated code. Thereafter, the processing proceeds to step S504.

In step S504, in order to acquire an image 12 captured by the in-vehicle camera 12, the processor 140 communicates with the vehicle 10 and remotely activates the in-vehicle camera 12 of the vehicle 10 for which the handover process is completed. The acquired image 12 is stored in a memory device of the vehicle 10. Thereafter, the processing proceeds to step S506. Instead of executing the processing of step S504, the vehicle 10 may include a control device programmed in advance to acquire the image 12 in order to read the designated code held over the in-vehicle camera 12.

In step S506, the processor 140 determines whether or not the designated code is displayed on the user device 200, based on the image 12 transmitted from the vehicle 10. As a result, when the display of the designated code is confirmed (step S506; Yes), the processing proceeds to step S108 (see FIG. 4). That is, when the display of the designated code is confirmed, it is determined that the user X has been present within the designated range 7 until the handover process is completed. Also, the processor 140 ends the presence confirmation process.

On the other hand, when the display of the designated code is not confirmed (step S506; No), the processing proceeds to "END". It should be noted that, when the display of the designated code is not confirmed, the processor 140 may repeatedly execute the processing of steps S502 to S506 a designated number of times or for a designated period of time.

4-5. Combination of Multiple Types of Presence Confirmation Processes

Two or more of the first to fourth examples described above may be combined. To be specific, for example, as illustrated in FIG. 13, the presence confirmation process may include a "first presence confirmation process" and a "second presence confirmation process" that is executed when the presence of the user X cannot be confirmed by the first presence confirmation process.

Figure 13:
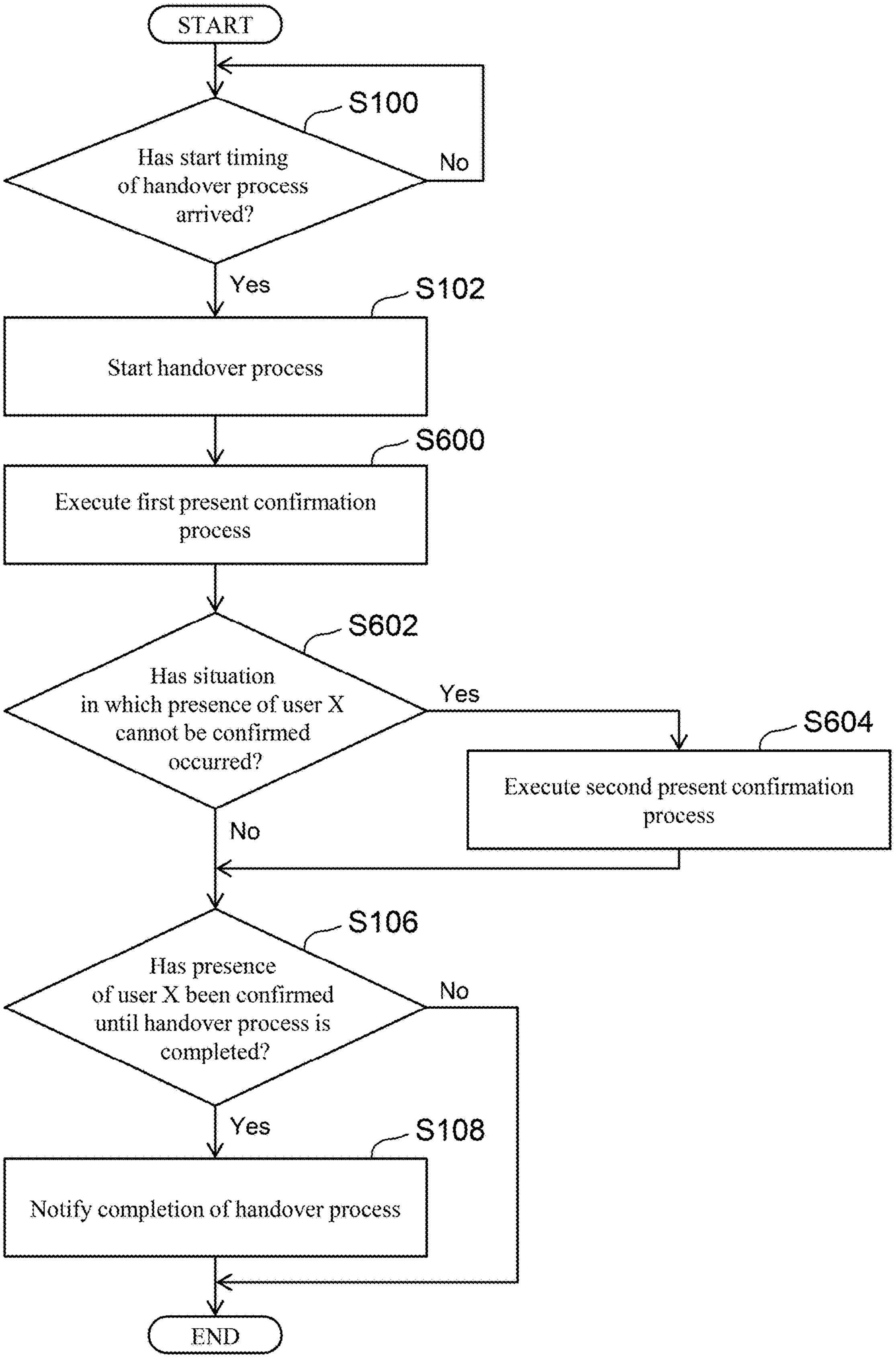
FIG. 13 is a flowchart illustrating an example of the flow of processing executed when a combination of multiple types of presence confirmation processes is used.

FIG. 13 is a flowchart illustrating an example of the flow of processing executed when a combination of multiple types of presence confirmation processes is used. More specifically, a combination of the first presence confirmation process and the second presence confirmation process is used here as an example of the multiple types of presence confirmation processes. The processing of the flowchart shown in FIG. 13 is different from the processing of the flowchart shown in FIG. 4 in the following points.

In FIG. 13, in step S600 subsequent to step S102, the processor 140 executes (start) the first presence confirmation process. The first presence confirmation process is any one of the first to fourth examples described above. Thereafter, the processing proceeds to step S602.

In step S602, the processor 140 determines whether or not a situation in which the presence of the user X cannot be confirmed by the first presence confirmation process has occurred. An example of this situation is when communication conditions related to the execution of the first presence confirmation process are poor. As a result, when the situation occurs (step S602; Yes), that is, when the first presence confirmation process is not valid, the processing proceeds to step S604. On the other hand, when the situation does not occur (step S602; No), the processing proceeds to step S106.

In step S604, the processor 140 ends the first presence confirmation process and executes (starts) the second presence confirmation process instead. The second presence confirmation process is another one of the first to fourth examples described above. Thereafter, the processing proceeds to step S106.

4-5-1. First Combination Example

In the first combination example, the first presence confirmation process is the presence confirmation process according to the first example (Tracking). Also, the second presence confirmation process is the presence confirmation process according to the third example (Confirming Code With Infrastructure Camera). Alternatively, the second presence confirmation process may be the presence confirmation process according to the fourth example (Confirming Code With In-Vehicle Camera).

Figure 14:
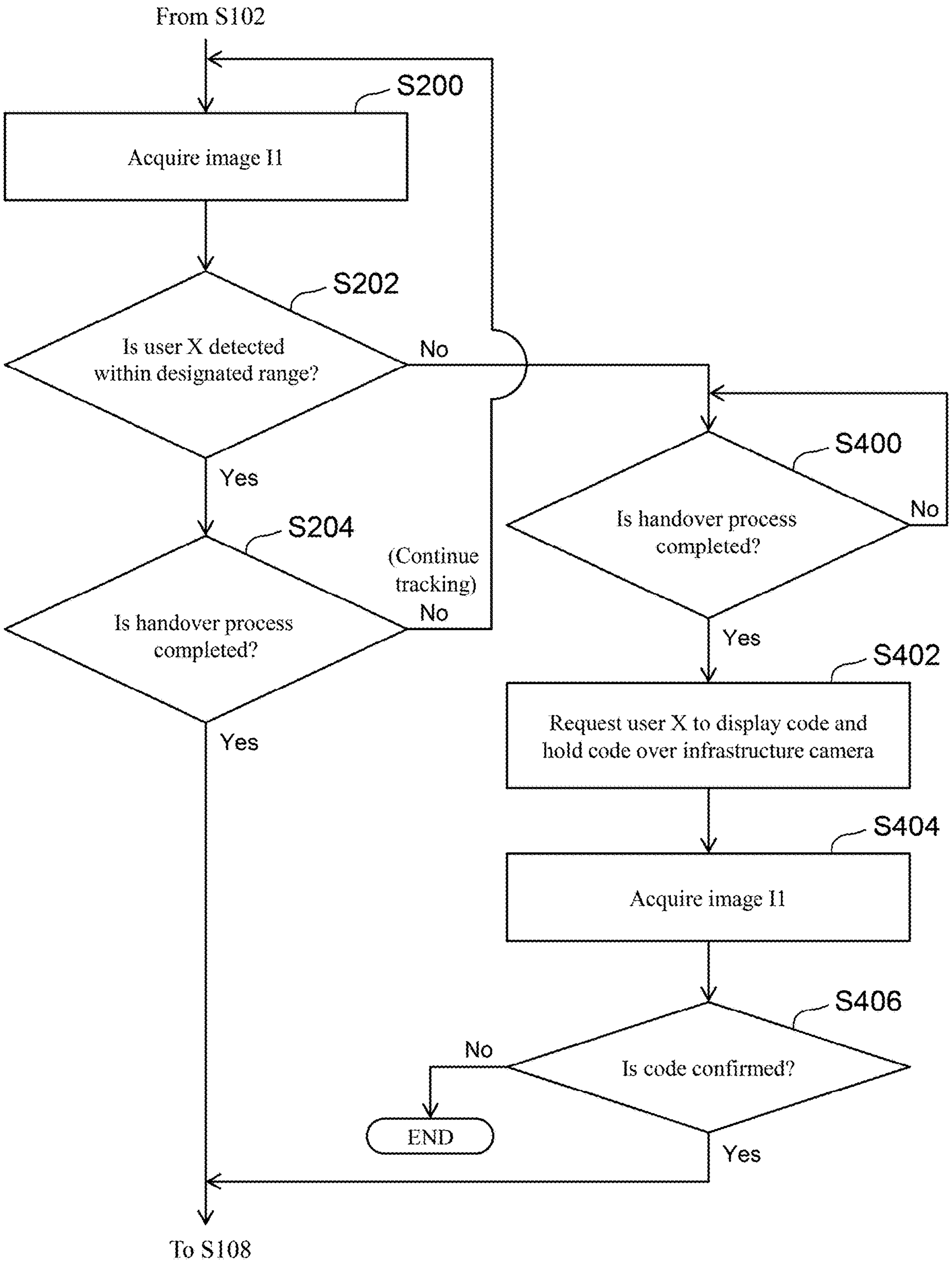
FIG. 14 is a flowchart illustrating an example of the flow of first and second presence confirmation processes according to a first combination example.

FIG. 14 is a flowchart illustrating an example of the flow of the first and second presence confirmation processes according to the first combination example. The processing of steps S600 to S604 and S106 in FIG. 13 is more specifically represented by the processing shown in FIG. 14 while reflecting the characteristics of the first combination example.

In FIG. 14, after step S102, the processing of steps S200 to S204 is sequentially executed as in the processing shown in FIG. 6. However, in FIG. 14, when the user X is not detected (step S202; No), the processing proceeds to step S400. Then, similarly to the processing shown in FIG. 10, the processing of steps S400 to S406 is sequentially executed.

Additionally, in an example in which the second presence confirmation process is the presence confirmation process according to the fourth example (Confirming Code With In-Vehicle Camera), the processing of steps S500 to S506 (see FIG. 12) is executed in FIG. 14 instead of the processing of steps S400 to S406.

4-5-2. Second Combination Example

In the second combination example, the first presence confirmation process is the presence confirmation process according to the second example (Near Field Communication). Also, the second presence confirmation process is the presence confirmation process according to the third example (Confirming Code With Infrastructure Camera). Alternatively, the second presence confirmation process may be the presence confirmation process according to the fourth example (Confirming Code With In-Vehicle Camera).

Figure 15:
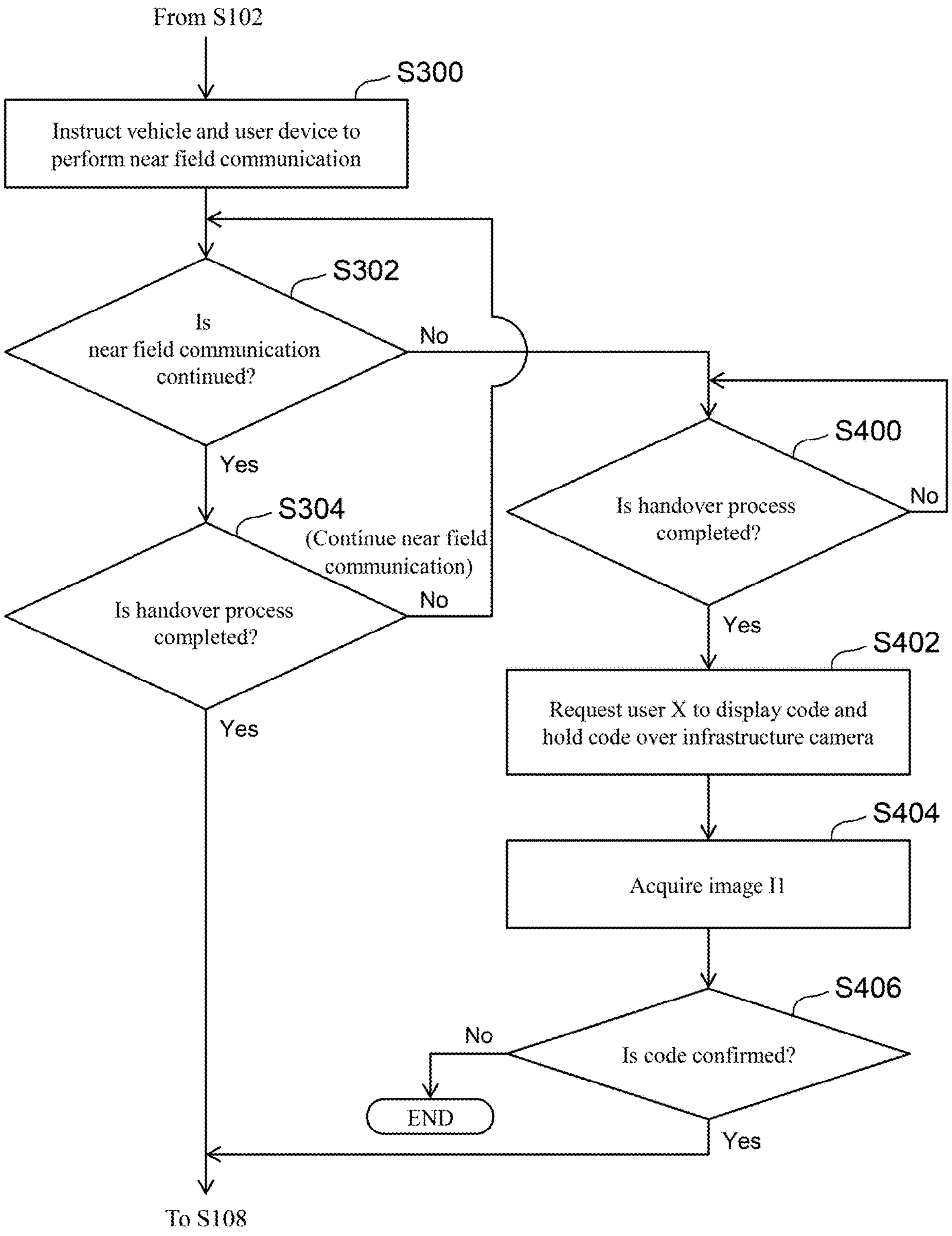
FIG. 15 is a flowchart illustrating an example of the flow of first and second presence confirmation processes according to a second combination example.

FIG. 15 is a flowchart illustrating an example of the flow of the first and second presence confirmation processes according to the second combination example. The processing of steps S600 to S604 and S106 in FIG. 13 is more specifically represented by the processing shown in FIG. 15 while reflecting the characteristics of the second combination example.

In FIG. 15, after step S102, the processing of steps S300, S302, and S304 is sequentially executed as in the processing shown in FIG. 8. However, in FIG. 15, when the near field communication is not continued (step S302; No), the processing proceeds to step S400. Then, similarly to the processing shown in FIG. 10, the processing of steps S400 to S406 is sequentially executed.

Additionally, in an example in which the second presence confirmation process is the presence confirmation process according to the fourth example (Confirming Code With In-Vehicle Camera), the processing of steps S500 to S506 (see FIG. 12) is executed in FIG. 15 instead of the processing of steps S400 to S406.

5. Effect

As described above, according to the present embodiment, the "presence confirmation process" is executed to confirm that the user who has dropped off the vehicle 10 (target vehicle) is present within the designated range 7 adjacent to the stop position 6 until the handover process is completed. Even if the vehicle 10 is not in an appropriate state when the handover process is completed, it is possible to quickly (smoothly) request the user who has already been confirmed to be present within the designated range 7 (that is, near the vehicle 10) to take additional measures for bringing the vehicle 10 into an appropriate state. This leads to reduction of occurrence of a situation in which the vehicle 10 gets stuck in place while the vehicle 10 cannot be operated. This is desirable from the viewpoint of quality and continuity of the service by the vehicle management system 100.

Additionally, according to each of the first example (Tracking) and the second example (Near Field Communication) of the presence confirmation process, the user operation (for example, the user holds a designated code over a camera) is not necessary, and the presence confirmation process is automatically executed. Therefore, the first or second example is easier for the user than the third and fourth examples in which the user needs to cause the camera (i.e., infrastructure camera 110 or in-vehicle camera 12) to read the designated code.

Moreover, as illustrated with reference to FIGS. 13 to 15, two or more of the first to fourth examples may be combined. By combining multiple types of presence confirmation processes, the accuracy of the user presence confirmation is further improved.

Additionally, regarding the combination of the multiple types of presence confirmation processes, the first presence confirmation process to be executed primarily can be said to be presence confirmation process having a higher priority than the second presence confirmation process. In the first combination example illustrated in FIG. 14, the first presence confirmation process is the first example (Tracking). That is, the processing automatically executed without requiring a user operation is executed as the first presence confirmation process. This makes it possible to appropriately combine multiple types of presence confirmation processes with consideration for user comfort. This also applies to the second combination example (see FIG. 15) in which the first presence confirmation process is the second example (Near Field Communication).

What is claimed is:

1. A vehicle management system for managing a vehicle, the vehicle management system comprising processing circuitry configured to:

before or after a target vehicle stops at a stop position, start a handover process for establishing a wireless communication with the target vehicle and transferring authority to operate the target vehicle from a user of the target vehicle to the vehicle management system;

execute a presence confirmation process for confirming that the user who has dropped off the target vehicle stopped at the stop position is present within a designated range adjacent to the stop position until completion of the handover process; and when confirming that the user is present within the designated range until the completion, notify the user of the completion, wherein the presence confirmation process includes:

acquiring one or more images captured by at least one camera having an angle of view including at least a part of the designated range;

after the completion, requesting the user to cause the at least one camera to read a designated code displayed on a user device of the user; and confirming, based on the one or more images, that the designated code is displayed on the user device.

2. The vehicle management system according to claim 1, wherein the presence confirmation process includes:

acquiring one or more images captured by the at least one camera having an angle of view including the designated range; and confirming that the user is present within the designated range until the completion, by tracking the user after dropping off the target vehicle based on the one or more images.

3. The vehicle management system according to claim 1, wherein the designated range corresponds to a communicable range of near field communication between the target vehicle and a user device of the user; and the presence confirmation process includes confirming that the user is present within the designated range until the completion, by confirming that the near field communication between the target vehicle and the user device is continued.

4. The vehicle management system according to claim 1, wherein the at least one camera includes at least one of an infrastructure camera and an in-vehicle camera mounted on the target vehicle.

5. The vehicle management system according to claim 1, wherein the presence confirmation process includes:

a first presence confirmation process; and a second presence confirmation process executed when the user cannot be confirmed to be present by the first presence confirmation process.

6. The vehicle management system according to claim 5, wherein the designated range corresponds to a communicable range of near field communication between the target vehicle and a user device of the user; and the first presence confirmation process includes confirming that the user is present within the designated range until the completion, by confirming that the near field communication between the target vehicle and the user device is continued.

7. The vehicle management system according to claim 1, wherein the target vehicle is configured to execute automated valet parking in a parking lot, and the stop position is a position at which the target vehicle entering the parking lot stops.

8. A vehicle management method for managing a vehicle, the vehicle management method, which is executed by a computer, comprising:

before or after a target vehicle stops at a stop position, starting a handover process for establishing a wireless communication with the target vehicle and transferring authority to operate the target vehicle from a user of the target vehicle to a vehicle management system;

executing a presence confirmation processor for confirming that the user who has dropped off the target vehicle stopped at the stop position is present within a designated range adjacent to the stop position until completion of the handover process; and when confirming that the user is present within the designated range until the completion, notifying the user of the completion, wherein the presence confirmation process includes:

acquiring one or more images captured by at least one camera having an angle of view including at least a part of the designated range;

after the completion, requesting the user to cause the at least one camera to read a designated code displayed on a user device of the user; and confirming, based on the one or more images, that the designated code is displayed on the user device.

9. A non-transitory computer-readable recording medium storing a vehicle management program executed by a computer for managing a vehicle, the vehicle management program causing the computer to execute:

before or after a target vehicle stops at a stop position, starting a handover process for establishing a wireless communication with the target vehicle and transferring authority to operate the target vehicle from a user of the target vehicle to a vehicle management system;

executing a presence confirmation processor for confirming that the user who has dropped off the target vehicle stopped at the stop position is present within a designated range adjacent to the stop position until completion of the handover process; and when confirming that the user is present within the designated range until the completion, notifying the user of the completion, wherein the presence confirmation process includes:

acquiring one or more images captured by at least one camera having an angle of view including at least a part of the designated range;

after the completion, requesting the user to cause the at least one camera to read a designated code displayed on a user device of the user; and confirming, based on the one or more images, that the designated code is displayed on the user device.

* * * * *